(12) United States Patent
Vander Pol et al.

(10) Patent No.: US 10,518,688 B2
(45) Date of Patent: Dec. 31, 2019

(54) GLASS TRANSPORT TRAILER

(71) Applicant: Trail King Industries, Inc., Mitchell, SD (US)

(72) Inventors: Scot J. Vander Pol, Mitchell, SD (US); John J. Job, Yankton, SD (US)

(73) Assignee: Trail King Industries, Inc., Mitchell, SD (US)

( * ) Notice: Subject to any disclaimer, the term of this patent is extended or adjusted under 35 U.S.C. 154(b) by 37 days.

(21) Appl. No.: 15/009,534

(22) Filed: Jan. 28, 2016

(65) Prior Publication Data
US 2017/0217353 A1    Aug. 3, 2017

(51) Int. Cl.
| | |
|---|---|
| *B60P 3/00* | (2006.01) |
| *B60P 7/10* | (2006.01) |
| *B62D 33/02* | (2006.01) |
| *B62D 53/06* | (2006.01) |

(52) U.S. Cl.
CPC ............... *B60P 3/002* (2013.01); *B60P 7/10* (2013.01); *B62D 33/02* (2013.01); *B62D 33/0207* (2013.01); *B62D 53/061* (2013.01)

(58) Field of Classification Search
CPC . B60P 3/002; B60P 7/10; B62D 63/08; B62D 33/0207; B62D 33/02; B62D 53/061; B60D 1/015

USPC ............... 410/32, 34, 35, 44; 296/3
See application file for complete search history.

(56) References Cited

U.S. PATENT DOCUMENTS

| | | | |
|---|---|---|---|
| 2,999,693 | A | 9/1961 | Thorson |
| 3,955,676 | A | 5/1976 | Hansen et al. |
| 4,273,485 | A | 6/1981 | Fischer et al. |
| 4,360,298 | A | 11/1982 | Fischer et al. |
| 4,527,826 | A | 7/1985 | O'Neal |
| 4,626,017 | A | 12/1986 | Robertson |
| 4,688,976 | A | 8/1987 | Rowley et al. |
| 4,865,511 | A | 9/1989 | Wegner |
| 5,114,288 | A | 5/1992 | Langendorf et al. |
| 5,148,924 | A | 9/1992 | Mason et al. |
| 5,209,540 | A | 5/1993 | Melter |
| 6,935,668 | B1 | 8/2005 | Summers |
| 7,607,873 | B2 * | 10/2009 | Wehrli ............ B60P 3/40 410/32 |
| 2008/0152453 | A1 * | 6/2008 | Mix ............ B65D 85/48 410/32 |

* cited by examiner

*Primary Examiner* — Stephen T Gordon
(74) *Attorney, Agent, or Firm* — Nelson Mullins Riley & Scarborough LLP

(57) ABSTRACT

A trailer for carrying plate glass has an elongated deck and an elongated rigid beam that extends above the deck. The beam supports plate glass transported by the trailer. The deck and the beam may be made from aluminum.

36 Claims, 11 Drawing Sheets

GLASS TRANSPORT TRAILER

BACKGROUND OF THE PRESENT INVENTION

The present invention relates to trailers for the transport of glass plates.

Glass plates may be transported by semi-trailers, and often by platform semi-trailers. A semi-trailer is a trailer without wheeled axles on its front end, instead having a mechanism, such as a kingpin or gooseneck, for connecting the trailer to a towing vehicle (such as a diesel tractor) that both tows the trailer and supports the trailer front end vertical load. The trailer typically has multiple wheeled axles at its rear end so that groups of two or four wheels rotate about the same axis and so that the trailer has at least two such wheel groups that rotate about at least two parallel axes.

A platform, or flatbed, trailer typically includes a flat loading deck without permanent sides or roof, where the trailer's chassis has a load-carrying main frame that supports the deck from underneath. The deck may sometimes have different levels, including one or more that drop below a main deck level. In glass transport trailers, a frame, often in the cross-sectional shape of an "A," is secured to the deck and defines planar receiving surfaces on opposite sides of the "A" cross-section that receive one or more sheets of glass to be secured to the A frame. To cover the glass, a tarp may be secured over the A frame or over a rectangular frame secured to the deck about the A frame. Since the A frame and, if present, a rectangular tarp frame or other enclosure, however, are not part of the chassis structure that distributes load from the deck to the wheels and the towing vehicle, these structures add to the trailer load without providing structural support.

SUMMARY OF THE INVENTION

A trailer for carrying plate glass in an embodiment of the present invention has an elongated deck having at least one deck segment defining a surface at an upper major side of the deck. An elongated rigid beam extends longitudinally in parallel with a longitudinal axis of the deck. A plurality of wheels is attached to at least one of the deck and the beam at a first end of the elongated deck at or below a lower major side of the deck opposite the upper major side so that the plurality of wheels are rotatable about at least one axis transverse to a longitudinal axis of the deck. A coupler for coupling to a wheeled rear end of a towing vehicle is attached to at least one of the deck and the beam and is disposed at a second end of the deck opposite the first end. The beam extends above at least a portion of the deck and is attached to the deck so that the beam transfers load from the deck to the plurality of wheels and the coupler. A generally planar receiving surface is defined by or attached to the beam above at least a portion of the deck so that the beam supports at least one glass plate received by the receiving surface in a direction perpendicular to the longitudinal axis and parallel to the generally planar surface.

In a further embodiment, a trailer for carrying plate glass has an elongated deck comprised of at least one deck segment defining a surface at an upper major side of the deck. An elongated rigid beam extends longitudinally in parallel with the longitudinal axis of the deck. A plurality of wheels is attached to at least one of the deck and the beam at a first end of the elongated deck at or below a lower major side of the deck opposite the upper major side so that the plurality of wheels are rotatable about a plurality of axes, each axis corresponding to at least two wheels of the plurality of wheels, transverse to a longitudinal axis of the deck. A coupler for coupling to a wheeled rear end of a towing vehicle is attached to at least one of the deck and the beam and is disposed at a second end of the deck opposite the first end. The beam extends above a highest portion of the deck between the coupler and the plurality of wheels and is attached to the deck so that beam transfers load from the deck to the plurality of wheels and the coupler. A generally planar receiving surface is defined by or attached to the beam above at least a portion of the deck so that the beam supports at least one glass plate received by the receiving surface.

BRIEF DESCRIPTION OF THE DRAWINGS

Aspects of the present invention can be better understood with reference to the following drawings. The components in the drawings are not necessarily to scale. An enabling disclosure of the present invention, including the best mode thereof, is set forth in the specification, which makes reference to the appended drawings, in which.

Figure 1A:
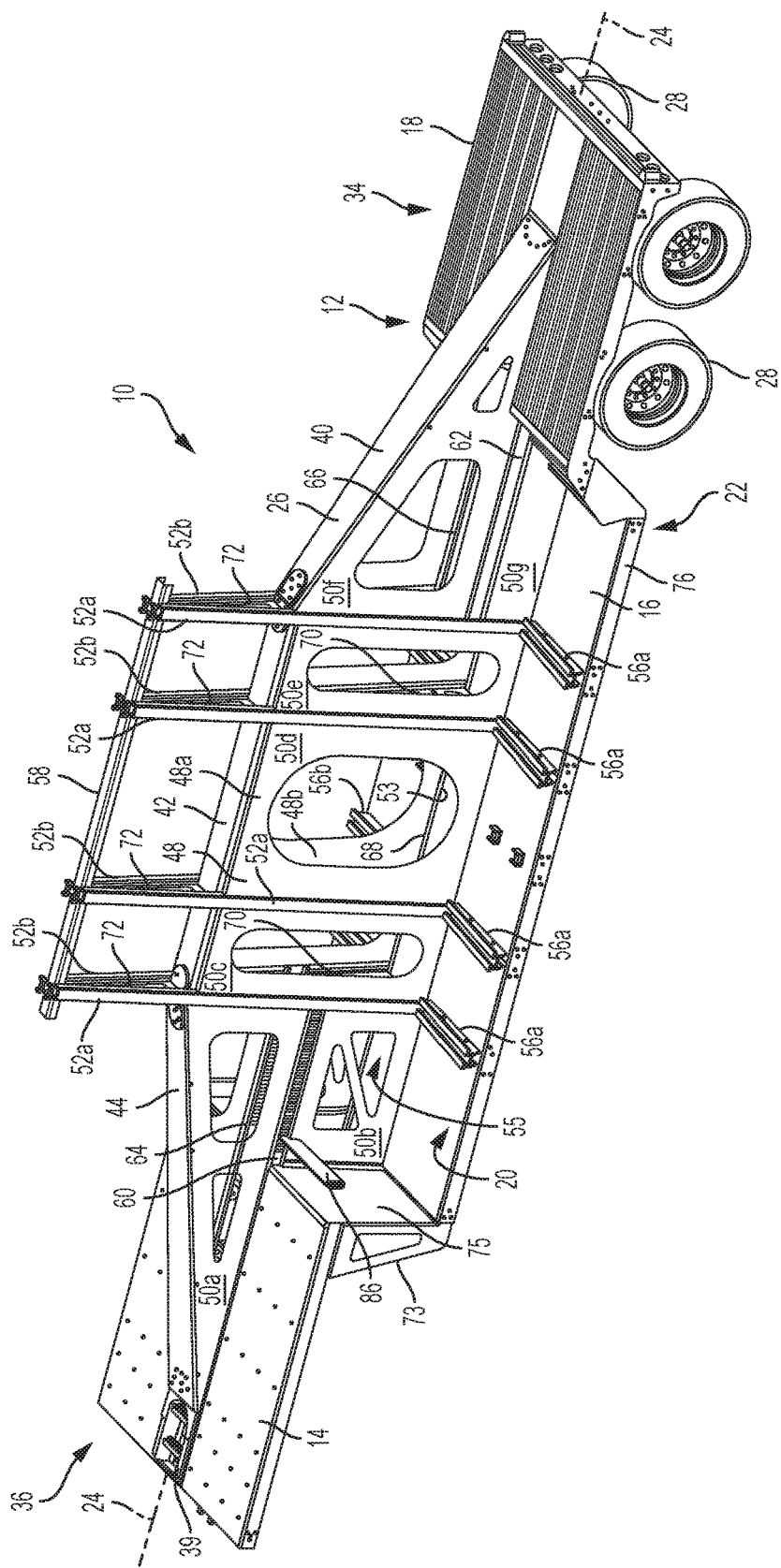
FIG. 1A is a perspective view of a glass plate trailer according to an embodiment of the present invention.

Repeat use of reference characters in the present specification and drawings is intended to represent same or analogous features or elements of embodiments of the present invention.

DETAILED DESCRIPTION OF EMBODIMENTS OF THE PRESENT INVENTION

Reference will now be made in detail to embodiments of the invention, one or more examples of which are illustrated in the accompanying drawings. Each example is provided by way of explanation of the invention, not limitation of the invention. In fact, it will be apparent to those skilled in the art that modifications and variations can be made in such examples without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
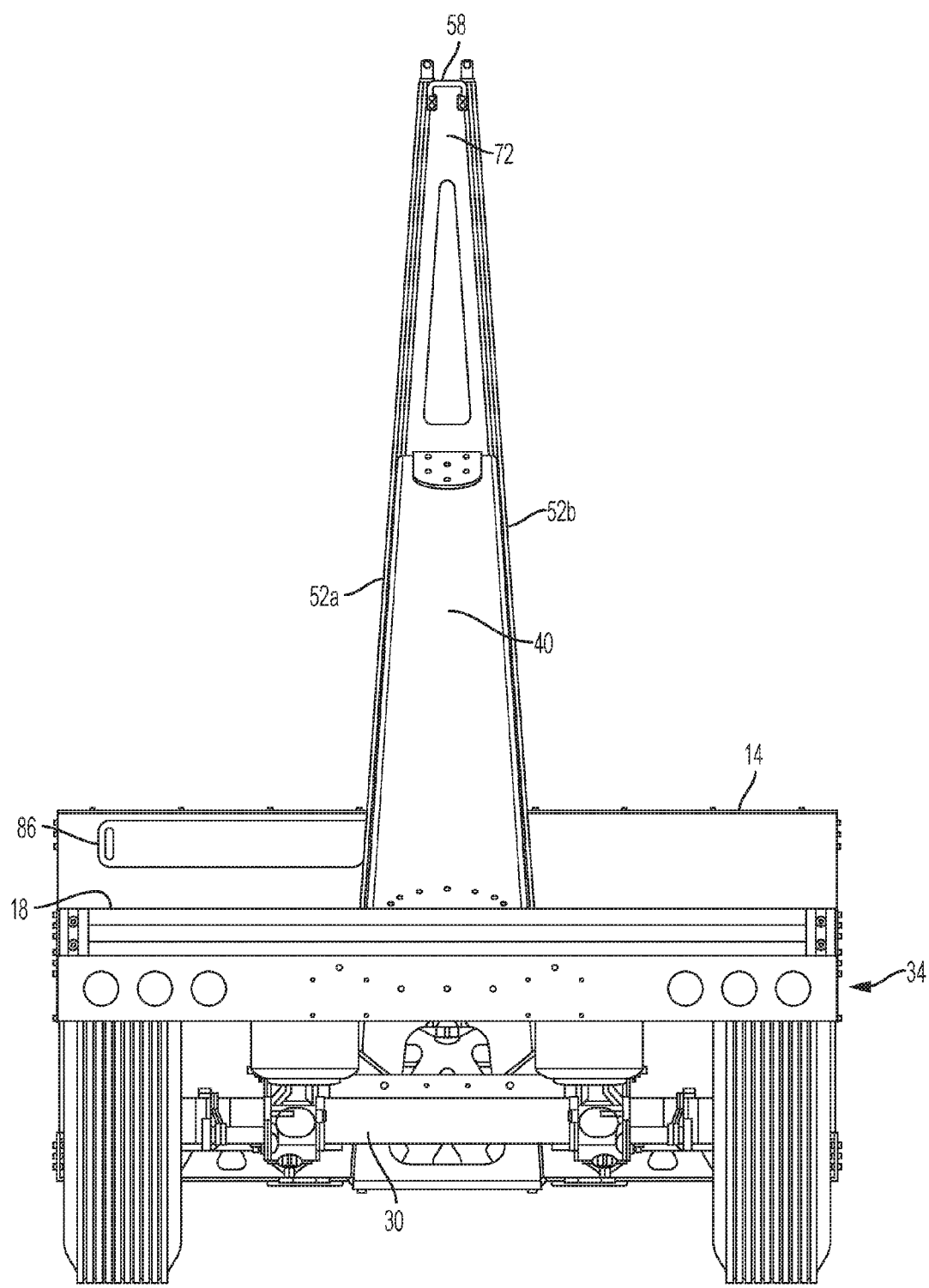
FIG. 2 is a rear view of the trailer as in FIG. 1A.
Figure 3:
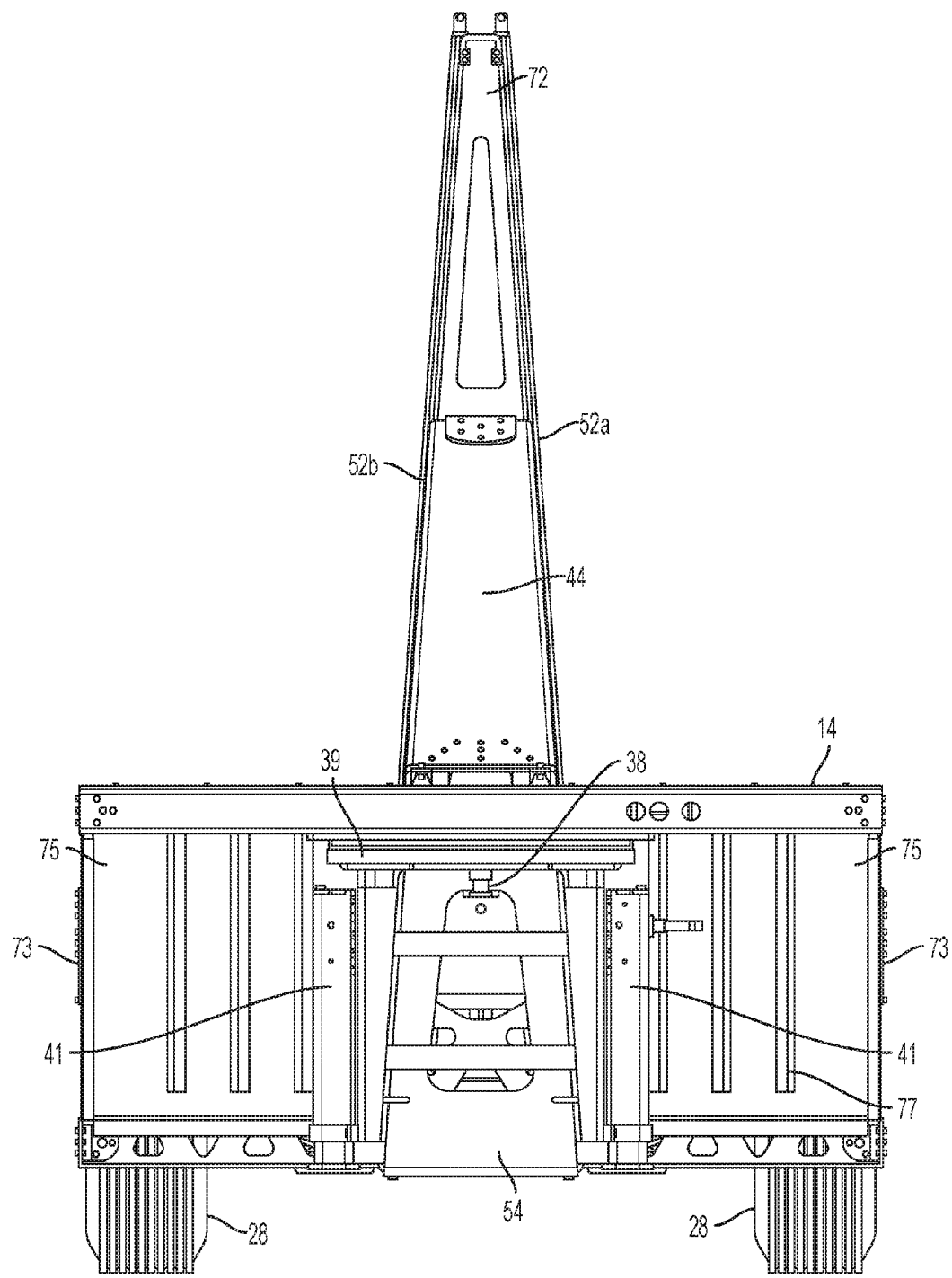
FIG. 3 is a front view of the trailer as in FIG. 1A.
Figure 4A:
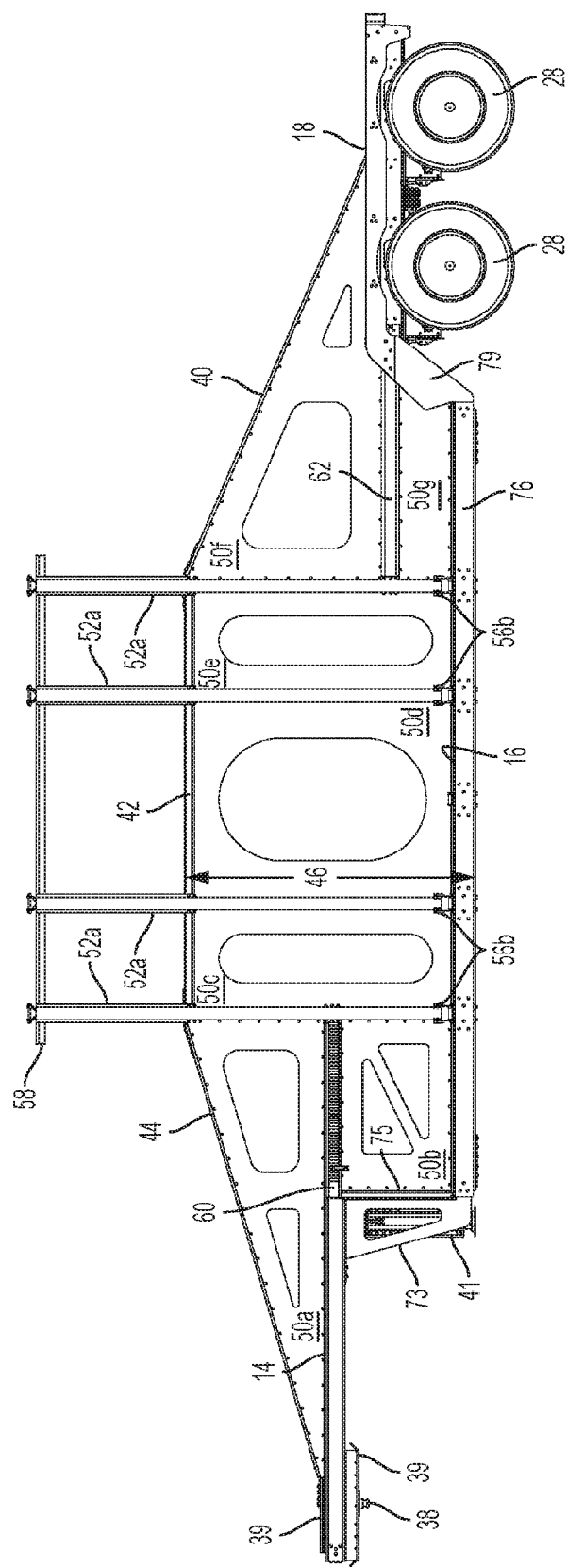
FIGS. 4A and 4B are side views of opposing sides of the trailer as in FIG. 1A.
Figure 4B:
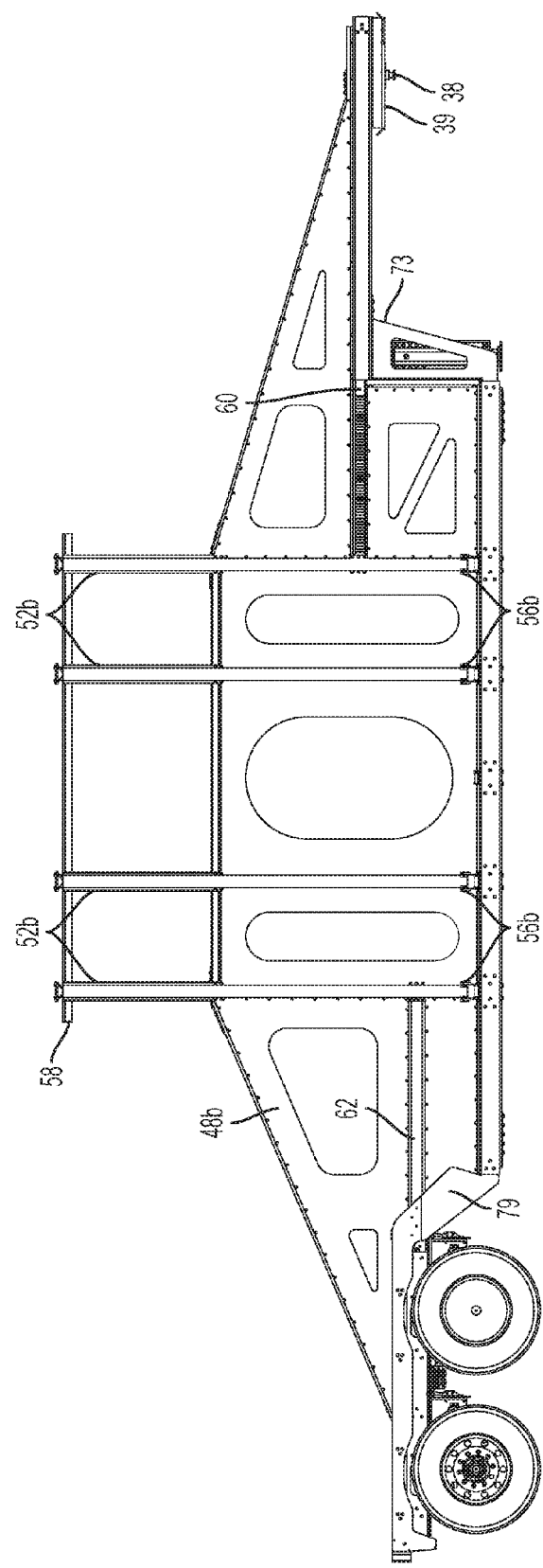

As used herein, terms referring to a direction or a position relative to the orientation of the trailer, such as but not limited to "vertical," "horizontal," "upper," "lower," "above," or "below," refer to directions and relative positions with respect to the trailer's orientation in its normal intended operation, for example as indicated in FIGS. 2, 3 and 4. Thus, for instance, the terms "vertical" and "upper"

refer to the vertical orientation and relative upper position in the perspective of FIGS. 2, 3 and 4 and should be understood in that context, even with respect to a trailer that may be disposed in a different orientation. The term "parallel" encompasses offset from and parallel to, as well as coincident with.

Further, the term "or" as used in this application and the appended claims is intended to mean an inclusive "or" rather than exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "and" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "and," and "b" may include plural references, and the meaning of "in" may include "in" and "on." The phrase "in one embodiment," as used herein, does not necessarily refer to the same embodiment, although it may.

Figure 1B:
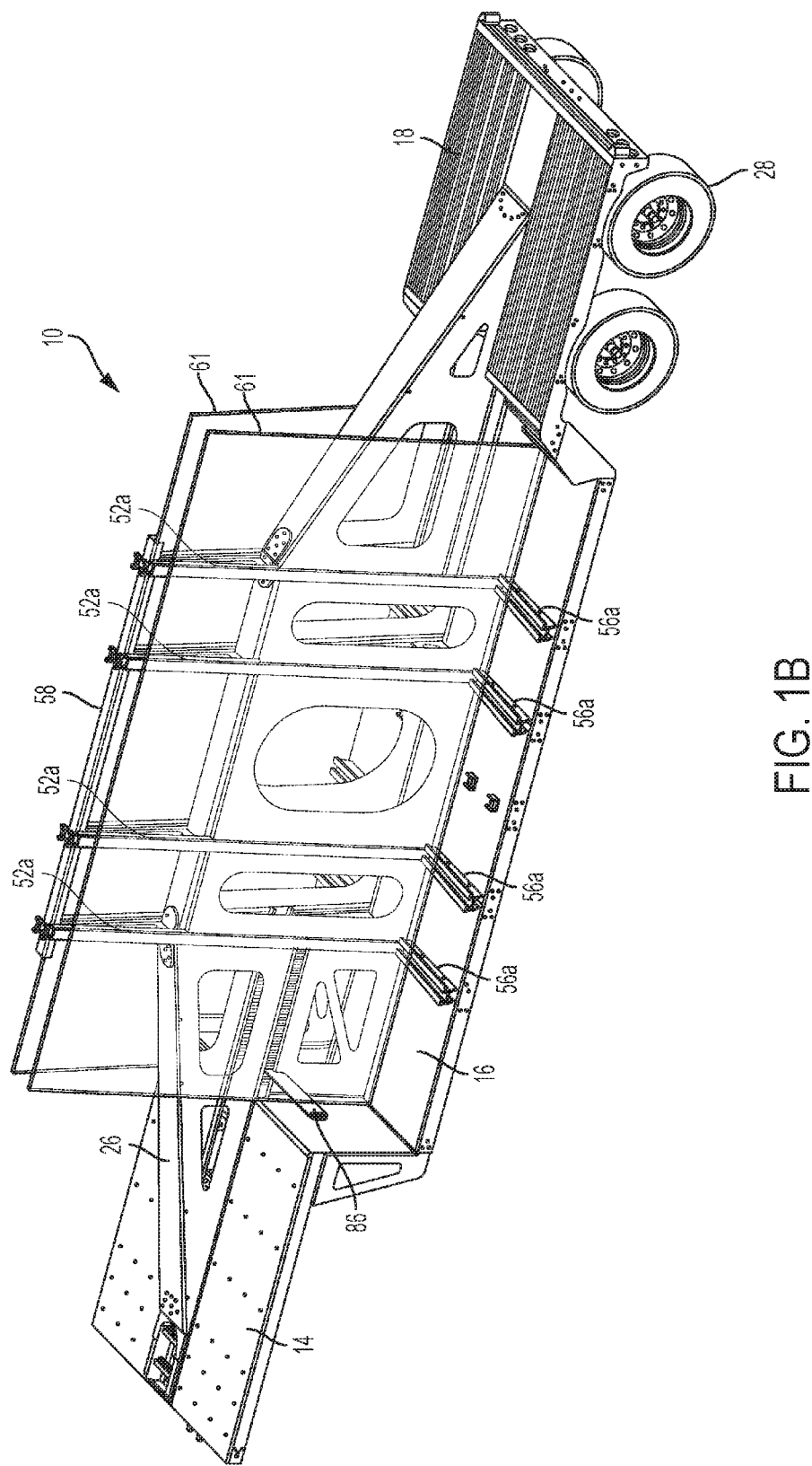
FIG. 1B is a perspective view of the trailer as in FIG. 1A, carrying plate glass.

Referring to FIGS. 1A and 1B, a trailer 10 for transporting glass plates has an elongated aluminum deck 12 having three vertically offset deck segments 14, 16, and 18. Each deck segment defines a generally planar surface at an upper major side of the deck, and, in combination, these upper surfaces define the upper major side. That is, the center-drop arrangement of trailer 10 defines three generally planar deck surfaces of a trailer having six sides, i.e., the narrow front and back sides, the long but narrow lateral sides, and the large surface area, or major, upper and lower sides. The upper surfaces of deck segments 14, 16, and 18 define the upper major side 20, while the undersides of these segments define the lower major side 22. A centerline 24 of deck 12 may be considered a longitudinal axis of the trailer, though it should be understood that axis 24 may be considered either as a straight axis passing generally through the trailer or as a segmented axis passing through the deck segments described below. An elongated rigid beam 26 extends longitudinally in parallel with deck longitudinal axis 24. In one or more embodiments, the deck (including deck's supporting structures except, in certain embodiments as described herein, center deck cross-members 81), beam 26, and other glass plate-supporting structures, are made entirely or partially from aluminum. It should be understood, however, that the aluminum configuration is present in one or more embodiments of the trailer, and that these trailer components may be made from steel or other suitable metal or other material in other embodiments.

Figure 5:
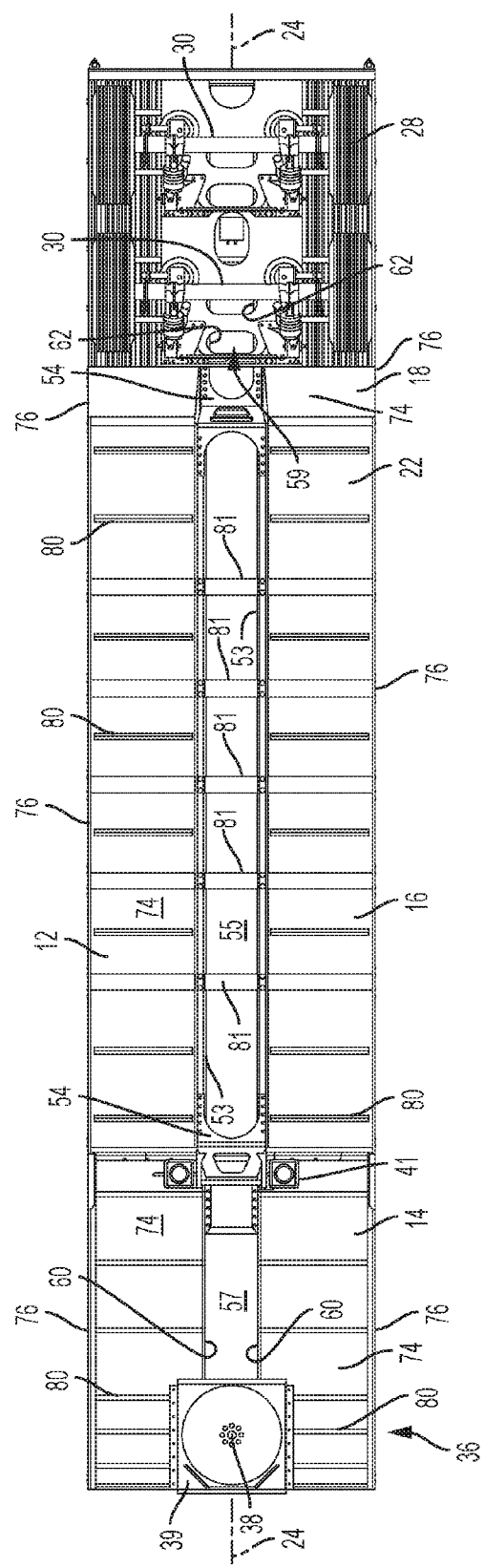
FIG. 5 is a bottom view of the trailer as in FIG. 1A.

A plurality of wheels 28 are received and secured to axles 30 (FIGS. 2 and 5) at a rear end 34 of trailer 10 (see also FIG. 8) so that opposing wheels 28 rotate about two parallel axes defined by the axles. Axles 30 are secured to the underside of deck segment 18 by a shock-absorbing suspension system, as should be understood.

At a front end 36 of trailer 10, a steel kingpin 38 (FIGS. 2, 3, 4A-4D, and 5) is attached by a kingpin frame 39, also made of steel, that is in turn secured within and extends through forward deck segment 14 by conventional means, to the underside of deck segment 14. As should be understood, kingpin 38 attaches to a fifth wheel of a semi-tractor so that the semi-tractor or other towing vehicle supports a vertical load from trailer front end 36 and tows trailer 10, with the remaining vertical load being received by axles 30 and wheels 28. Beam 26 extends longitudinally between wheel axles 30 and kingpin 38 so that the beam transfers load from the deck, which is attached to beam 26 as described below, to the kingpin and the wheels. In the presently described embodiments, beam 26 is directly attached to kingpin frame 39, and is attached to axles 30 through the suspension structure, with deck 12 being attached to the beam so that the deck's load transfers to the kingpin/kingpin frame and the wheeled axles through the beam. As such, beam 26 is attached to and extends between the kingpin/kingpin frame and the wheeled axles to thereby transfer the trailer's load from the deck and the beam to the kingpin/kingpin frame and the wheeled axles. In other embodiments, portions of the deck may attach directly to the kingpin frame and axle suspension, so that the beam attaches to the kingpin frame and the axle suspension via the intervening deck, but the beam still transfers load from the glass plate(s) and other portions of the deck to the kingpin frame and axles. A pair of telescoping support legs 41 (FIGS. 4A, 5, and 7) are part of a carriage attached to the lower flange portion of beam 26 (and, more specifically, to a transitional piece 54 that connects the horizontal members of the beam's bottom flange at deck segments 14 and 16) at the underside of forward deck segment 14 and can be extended to support the trailer front end when the trailer is not attached to a tractor at kingpin 38.

It should be understood in view of the present disclosure that the kingpin/fifth wheel configuration is an example of a coupler that may couple the trailer to a wheeled rear end of a towing vehicle, but that other couplers and coupler arrangements may be implemented. For instance, a kingpin may connect to a semi-tractor through an intermediate trailer and converter dolly, in which instance the intermediate trailer may be considered part of the coupler or part of the wheeled towing vehicle. Similarly, while kingpins are in common use, a coupler other than a kingpin configuration could be utilized.

Figure 7:
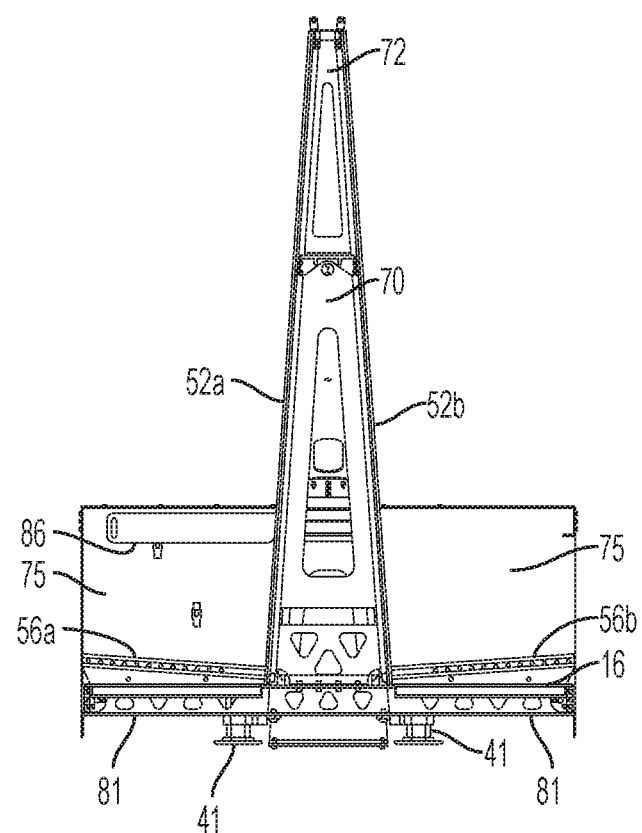
FIG. 7 is a rear view, in section at the trailer center, of the trailer as in FIG. 1A.
Figure 8:
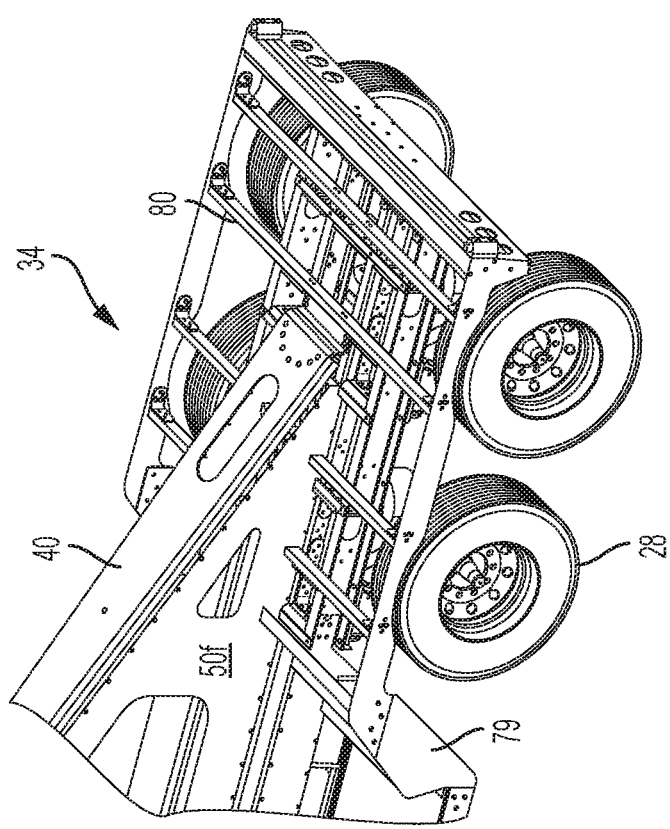
FIG. 8 is a partial perspective view of a rear end of the trailer as in FIG. 1A, with top decking removed.

Elongated beam 26 is generally in the form of a box beam in that it has opposing flanges with a web that comprises two generally vertical sheets that extend between opposing upper and lower flanges, between respective sides of the opposing upper and lower flanges, where the web is generally taller than the opposing upper and lower flanges are wide, although in the embodiments illustrated the web narrows at either beam end so that the opposing flanges come together at the ends. The beam's upper flange is formed by three sections 40, 42, and 44, each formed of a C-shaped cross-section aluminum extrusion (section 42) or formed piece (sections 40 and 44) with a generally planar middle portion as its major part, so that each section 40, 42, and 44 may be described herein as generally planar. Center generally planar section 42 is disposed horizontally with respect to the deck, so that any two orthogonal dimensions defined by the planar upper surface of upper section 42 are both parallel to the planar surface of center deck segment 16. Each of the upper flange's front and back sections 40 and 44 extend from center flange section 42 to respective deck segments 18 and 14 at an acute angle with respect to horizontal. In both forward flange section 44 and rearward flange section 40 of the upper beam flange, the planar dimension that is perpendicular to longitudinal deck flange axis 24 (and, therefore, transverse across the width of the elongated upper flange sections) is parallel to the planar upper surfaces of deck segments 14, 16, and 18 for the entire lengths of flange sections 44 and 40. This is also true of center flange section 42. As indicated in FIGS. 7 and 8, sections 40 and 44 may be formed with through holes encompassing the longitudinal center lines of the sections, thereby reducing weight, without materially reducing each member's strength. Center section 42 may be similarly constructed.

Beam 26 is illustrated and described herein as a unitary beam, extending the trailer's length between the kingpin and the wheel suspension, and for ease of explanation, this structure is described with respect to the embodiments discussed herein. It should be understood, however, that this is for purposes of illustration and explanation and not limitation. For example, beam 26 may be formed in other suitable configurations, for example in discrete segments arranged sequentially along the trailer axis or as discrete segments separated from each other but each extending the length of the trailer between the kingpin and the wheel suspension in parallel to each other and the trailer axis. In its various possible configurations, beam 26 transfers load from the deck to the kingpin and the wheel suspension and materially contributes to the trailer's structural rigidity.

In the presently described embodiments, a vertical distance 46 (FIG. 4A) between the bottom of the beam's lower flange and the upper planar surface of center section 42 of the beam's upper flange is approximately 95 inches, or eight feet, or greater. In view of the present disclosure, it will be understood that this distance may vary, but in certain embodiments is about four feet or greater so that the beam can transfer an expected load from the deck and glass plates the trailer is expected to carry, without the need for pre-stress in the beam and without substantial compression/deformation in the beam. Since, as described below, the beam supports the glass plates and the frame structure on which the plates rest, a sufficient beam height to preclude material beam distortion inhibits shifting or other movement of the glass frame (the frame may be considered in some embodiments to be part of the beam) and/or of the glass plates relative to the frame and the beam. As is apparent from the figures, center section 42 of the upper beam flange is vertically offset from center deck segment 16 by a distance that is greater than the respective vertical offsets between center deck section 16 and either of forward or aft deck segments 14 and 18, and for example is taller, with respect to the center deck segment, than is either of the forward or rearward deck segments as they extend between kingpin 38 and axles 30. In certain embodiments, forward, or foredeck, segment 14 is at the same height (with respect to center deck segment 16) as or greater height than rearward, or aft, deck segment 18 and is at a height of about four feet or less with respect to center deck segment 16. In such embodiments, the beam's maximum height is greater than the maximum deck segment height.

Beam 26 also comprises a web 48 that extends vertically between the beam's upper flange and its lower flange (described below) attached to deck segments 14, 16, and 18. In the illustrated embodiments, web 48 is comprised of two metallic sheets 48a and 48b that extend between the lower beam flange at the deck and the upper flange (40, 42, 44), the web sheets extending between respective sides of the two flanges to thereby form the beam's box-shaped cross section. Web sheet 48a is comprised of a plurality of aluminum polygonal sheet panels 50a-50g that are formed discretely from each other and separately assembled onto the trailer. As should be understood in view of the present disclosure, each of panels 50a-50g is a load bearing member that primarily resists shear forces, and particularly compression and tension forces, applied to beam 26. As should also be understood in view of this disclosure, central portions of the web material may be omitted from the web and web panels without materially impacting the web's ability to resist the load placed upon it. Accordingly, most of the web panels define through-holes in their central areas, encompassing the respective panels' neutral axes, that thereby reduce trailer weight (as compared to what the trailer's weight would be if panels of continuous material were used) without materially sacrificing beam rigidity or strength. Web 48b (FIG. 4B) is a mirror image of web 48a. It is constructed and assembled in the same manner as is web 48a and is not, therefore, described further herein.

Each of webs 48a and 48b is disposed at an acute angle (e.g. about 4°) with respect to vertical as it extends from the beam's upper flange down to the beam's lower flange and the deck. As discussed in more detail below, the web panels are disposed at this angle with respect to vertical in order to match the angle of descent of vertical glass-supporting beam rails 52a and 52b, which in the embodiments described herein also form part of beam webs 48a and 48b. In other embodiments, however, vertical web portions 48a and 48b may be disposed at a 0° angle with respect to vertical, i.e., at a 90° intersection with the horizontal deck surface. In such embodiments, glass plate support beams 52a and 52b may nonetheless maintain the slight (in this instance, 4°) angle with respect to vertical and attach to upper flange section 42 of beam 26 to thereby transfer lateral load to the chassis beam.

As noted above, beam 26 is arranged as a box beam in supporting vertical load applied to deck 12, where the box beam's upper flange comprises flange portions 40, 42, and 41. Its bottom, or lower, flange is comprised at center deck segment 16 of a pair of opposed C-shaped aluminum beams 53 (FIGS. 1A and 5) that extend longitudinally along the trailer center section, parallel to trailer longitudinal axis 24, on either side of a through-opening 55 that extends entirely vertically through deck 12. The C-shaped cross section of each beam opens toward opening 55 and the opposing beam 53, so that each of the two C-shaped beams' webs is oriented vertically. Since opening 55 is laterally within the bounds of the glass plate-supporting frame, no decking is needed in that area, and decking structure is therefore omitted to thereby reduce weight. The lower flange of beam 26 at forward deck segment 14 is formed by a pair of aluminum I-beams 60 (FIGS. 1A, 1B, 4A, 4B, 4C, and 5) on opposing sides of a through-opening 57 (FIG. 5) in forward deck segment 14, extending parallel to trailer longitudinal axis 24. Each I-beam 60 attaches at one end to kingpin frame 39 and to, through, and beyond transition piece 54 to one of the vertical glass plate support rails 52a/b and a support bracket 70 (each described below), at its other end. I-beams 60 are oriented so that their center webs are oriented vertically. Similarly, the lower flange of beam 26 at aft deck segment 18 is formed by a pair of aluminum I-beams 62 (FIGS. 1A, 1B, 4A, 4B, 4C, and 5) on opposing sides of a through-opening 59 (FIG. 5) in aft deck segment 18, extending parallel to trailer longitudinal axis 24. Each I-beam 62 attaches at one end to the suspension for wheeled axles 30 and to, through, and beyond transition piece 54 to one of the vertical glass plate support rails 52a/b and a support bracket 70, at its other end. As with beams 60, beams 62 are oriented so that their center webs are vertical. As is apparent from the figures, beams 60 and 62 of the forward and aft deck segments overlap beams 53 of center deck segment 16 to some extent, but beams 53, 60, and 62 (and transition pieces 54) are considered together to comprise the lower flange of beam 26. Webs 48a and 48b of beam 26 are attached to the upper beam flange (sections 40, 42, and 44) and to the lower beam flange (beams 53, 60, and 62) and extend vertically therebetween on opposite sides of through-openings 55, 57, and 59.

In the configuration illustrated in the present figures, load applied to the deck, and particularly to center deck segment 16, in the downward vertical direction urges the deck to bend downward at the deck's center, thereby tending to put beam 26 in tension at the bottom of the beam, near the deck, and in compression at the top of the beam, near upper flange sections 40, 42, and 44. Platform trailers that utilize I-beam chassis below the deck often pre-stress the beam so that the beam, and consequently also the deck, bow upward at the trailer deck's center when the trailer is unloaded, thereby increasing the beam's ability to support high loads. The above-deck beam 26 described herein may also be pre-stressed, so that in an unloaded condition the beam and deck bow slightly upward at the trailer's middle. In certain embodiments, however, height 46 (FIG. 4A) between deck segment 16 and upper flange portion 42 is sufficient so that beam 26 can, without pre-stress, support the expected load range of deck 12 without an undesirable degree of center depression. As noted above, in certain embodiments, height 46 is about four feet or greater, or in certain embodiments about eight feet or greater. It should be understood in view of the present disclosure, however, that the beam height in a given embodiment may depend on several factors, including but not limited to the beam's configuration and rigidity, the deck's configuration and rigidity, and the expected amount of load that the deck will bear.

As noted above, trailer 10 includes four vertically-extending plate glass rails 52a on one side of beam 26 and four rails 52b on the beam's opposing side. Rails 52a and 52b extend to a height above center deck section 16 sufficient to support a range of glass plates 61 (FIG. 1B) that the trailer is expected to transport. A plurality of bottom support rails 56a and 56b are disposed on center deck portion 16 transversely to the deck surface, a respective lateral support 56a and 56b being provided for each vertical rail 52a and 52b. Each lateral support rail 56a and 56b attaches to its corresponding vertical support rail 52a or 52b so that when a glass plate rests upon a transverse support rail 56a or 56b, the transverse support rail transfers that vertical load to its vertical support rail.

As noted above, vertical rails 52a and 52b are disposed at a slight (4°, e.g.) acute angle with respect to vertical. The upper (i.e. glass plate receiving) surface of each transverse rail 56a and 56b forms a 90° angle with respect to its corresponding outward facing (i.e. glass plate receiving) surface of vertical rail 52a or 52b. Due to the vertical rails' (52a and 52b) slight tilt, the upper surfaces of the transverse rails (56a and 56b) form a corresponding slight acute angle with respect to the plane of center deck segment 16. As a result, glass plates 61 (FIG. 1B) carried by trailer 10, which are disposed on the transverse rails so that a long, narrow side edge of each plate rests on the transverse rails and one of the two major planar sides of the plate rests against the plate receiving surface defined by the outward facing surfaces of vertical rails 52a or 52b (or on an intervening glass plate), load not only center deck segment 16 (in the downward vertical direction, via transverse rails 56a or 56b), but also load beam 26 via vertical rails 52a or 52b (in a direction perpendicular to trailer longitudinal axis 24 and parallel to the deck surfaces, i.e., laterally with respect to the trailer). As described in more detail below, vertical rails 52a/b and transverse rails 56a/b attach to cross members 81 (FIGS. 5 and 7) of center deck segment 16, so that the center deck segment transfers most of the vertical load from the glass plates to the center beam. In other embodiments, the glass frame rails attach directly to beam 26 so that the glass plates' vertical load applies directly to beam 26. In such embodiments, the glass plate receiving surface formed by vertical rails 52a/b and bounded by transverse rails 56a/b transfers load from the glass plates it supports to beam 26 without intermediately relying on the deck, and in certain embodiments transfers such load only to the beam.

An aluminum longitudinally aligned top rail 58 attached to the upper ends of vertical glass plate support rails 52a and 52b serves as an attachment point upon which to secure a tarp or a tarp frame or other covering frame by which the trailer, and the glass plates it may carry, can be covered while the trailer is in use. In one or more embodiments, top rail 58 has a coupling point at which one or more straps may be secured. Each strap extends across the glass plate to connect at a coupling point at the trailer rear end to thereby assist in securing the plates on the trailer.

In the illustrated embodiments, vertical rails 52a and 52b are integrally constructed into beam 26. For example, each rail 52a and 52b is in the form of an I-beam, with the opposing flanges of each I-beam extending in respective planes that are perpendicular to the trailer's longitudinal axis 24 and with the I-beam's web that extends between the two flanges in a direction parallel to trailer longitudinal axis 24. The flanges of rails 52a and 52b extend slightly proud of the planar surface defined by the main body portions of the respective web sheets 48a and 48b, so that the vertical rails' flange ends collectively define the vertically-extending plate glass receiving surface. Moreover, the rails are aligned parallel to each other so that each of the respective plate glass receiving surfaces defined by the rail flange edges at the opposing sides of beam 26 is generally planar.

Each panel 50a-50g attaches to one of the I-beam flanges of vertical glass plate-receiving rails 52a and 52b. For example, while each of the web panels is generally planar, each panel defines one or more flanges around its edges that are bent or otherwise formed at a 90° angle or near thereto (e.g. more or less than 90° by the amount of the angle of the panel 50a-50g with respect to vertical, for the lower and upper panel flanges, respectively) with respect to the plane of the main panel portion. These flanges on the panel vertical sides, which in the assembled trailer are parallel to and abut the outer flanges of webs 52a and 52b, are then attached to the vertical rails' (52a and 52b) flanges by screws, rivets, welding or other suitable attachment mechanism. Other such flanges on certain of the panels' upper sides abut the underside of the chassis beam's (26) upper flange (40, 42, 44), at which the panels are secured to the beam's upper flange by similar means. As described above, a pair of longitudinally-aligned I-beams 60 and 62 are disposed so that the upper and lower flanges of each I-beam are parallel to the upper surface of deck segments 14 and 16. Web panel 50a defines a lower side flange 64 (seen in FIG. 1A on the corresponding panel of web sheet 48b) parallel to and abutting the top flange of beam 60, at which panel 50a is attached to I-beam 60. The identical structure is provided in the corresponding panel of web sheet 48b. Similarly, panel 50b includes an upper side flange that extends laterally outward from the panel's main portion and abuts the bottom flange of I-beam 60, by which panel 50b is attached to I-beam 60. Panel 50f includes a laterally-inward extending flange 66 along its bottom edge that is parallel to, abuts, and is attached to the upper flange of I-beam 62. Panel 50g includes an outwardly-extending flange at its top edge by which panel 50g attaches the bottom flange of I-beam 62. In alternate embodiments, the web panels do not have peripheral flanges. Instead, each panel is a planar sheet that can be attached to an adjacent structural component of the wall by welding at the abutting joint.

A plurality of triangular-shaped brackets 70 (see also FIG. 7) seat upon bottom flange beams 53 (or upon peripheral flanges of the web panels that sit upon beams 53) of beam 26 (they may abut upper portion 42 of the beam's upper flange, but in the illustrated embodiments do not). The vertical sides of each bracket 70 are disposed at the same slight acute angle with respect to vertical as are rails 52*a* and 52*b*, and each pair of rails rests upon the sides of a respective bracket 70. As such, brackets 70 function to stiffen the opposing vertical rails 52*a* and 52*b*. Each bracket 70 is of an aluminum, planar sheet-like construction that is disposed in a plane perpendicular to longitudinal trailer axis 24 but that, like the individual panels of web sheets 48*a* and 48*b*, omits a portion in the center of each central planar portion to reduce trailer weight without materially sacrificing strength. The long side edges of each bracket 70 are welded to the flanges of glass plate rails 52*a* and 52*b*. Each bracket may also be welded to the top of a main lower cross beam (described below) if constructed and arranged so that the bracket rests on a cross-beam.

Similarly, a plurality of brackets 72 (see also FIGS. 2, 3, and 7) are provided between rails 52*a* and 52*b* above respective brackets 70, and between center section 42 of the upper flange of beam 26 and longitudinal top rail 58. Similarly to brackets 70, brackets 72 are formed by a central planar sheet, with a center section removed for weight advantage, and are welded at their side edges to the flanges of rails 52*a* and 52*b*.

A pair of front brackets 73 extend between and provide rigidity support to center deck segment 16 and forward deck segment 14, as do vertical transition sheets 75, on either side of the trailer and beam 26. Vertical support members 77 (FIG. 3) are provided on the forward face of transition sheets 75. Similarly, opposing brackets 79 on opposite sides of trailer 10 connect and support center deck segment 16 and aft deck segment 18. Transition sheets 75 may also be formed integrally with the planar deck sheeting that forms upper deck 14, bent to a 90° angle.

As discussed above, deck 12 and elongated beam 26 including glass plate rails 52*a* and 52*b*, and longitudinal top rail 58 are made of aluminum, e.g. 0.190 smooth aluminum for the upper decking surfaces of forward and center sections 14 and 16 and 1.125 aluminum extrusion decking for rear deck section 18. Referring also to the underside view of deck 12 provided in FIG. 5, each deck segment is comprised of two sheets of aluminum 74 on opposite sides of the respective through-hole (55, 57, and 59), that together form the upper deck segment surface, and a pair of aluminum sheet side flanges 76 that are attached to the deck sheets at transverse side flanges that extend at a 90° angle downward from the edges of the deck sheets (or, if formed integrally with the upper deck sheets, that bend downward from the main sheets 74). A plurality of small C-channel shaped cross members 80, also made of aluminum, extend between side flanges 76 and a corresponding lower beam flange portion 53, 60, or 62 and support a given deck surface sheet 74 for foot transfer on the deck sheet. Each C-channel beam 80 is oriented so that its web is vertical and its upper flange flush against the bottom of deck sheet 74. Each top deck sheet 74 is attached to its cross members 80 by screws, rivets, welds or other attachment means, for example screws or rivets driven through the top of sheet 74 and the upper flanges of cross members 80. FIG. 8 illustrates rear end 34 without its upper decking material, illustrating cross members 80 in the rear, or aft, end.

Figure 4C:
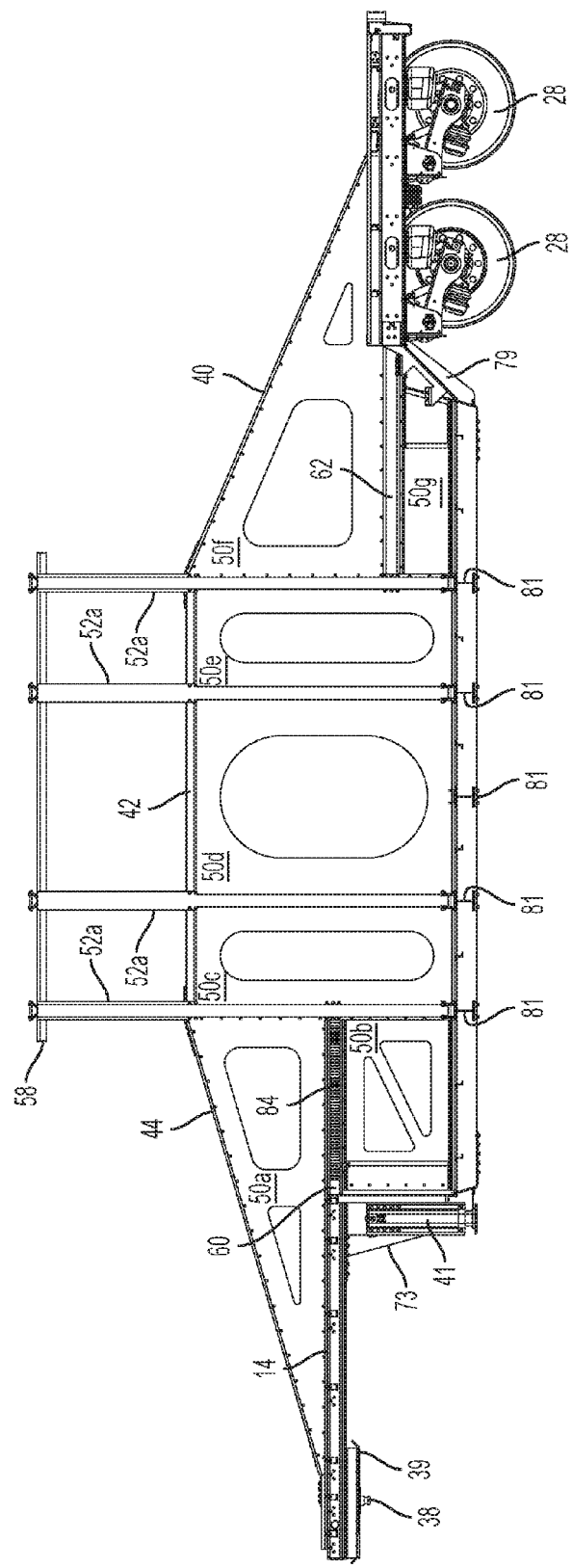
FIG. 4C is a partial side view of the trailer as in FIG. 1A.

Five I-beam shaped cross members 81 (FIGS. 5 and 7) extend entirely across the width of lower deck segment 16, beneath the decking. Each cross member 81 attaches by rivets (see FIGS. 1A, 1B, 4A, and 4B) or welding to the inner surfaces of deck skirt portions 76. FIG. 4C provides a side view of the trailer, with the skirt portions, near side support members 73 and 79, and near wheels 28 removed, exposing cross members 81 to a side view. As indicated in the figure, cross members 81 are oriented so that their center web portions are vertical. The cross members pass through holes in the main web portions of the two C-shaped beams 53, so that cross members 81 traverse through-hole 55 over the lower side thereof. Each cross member 81 is welded or attached by rivets or other means to the two beams 53 at the beams' intersections. Further, the vertical side support rails 52*a* and 52*b* extend through the decking of center deck segment 16 and abut respective cross members 81, so that the vertical glass plate rails are supported directly by the cross beams 81. In one embodiment, a bracket and/or weldment may be provided between the ends of rails 52*a/b* and cross members 81 to secure these components together.

Through their abutting support of the upper decking of center deck segment 16, and their attachment to vertical rails 52*a* and 52*b*, main cross members 81 receive the primary vertical load from the center deck and the glass frame, transferring that load to beam 26 through the cross beams' attachment to the beams 53 forming the bottom flange of beam 26. In the illustrated embodiments, cross beams 81 are made of steel, but it should be understood the cross beams may also be made from aluminum or other metal.

Figure 6:
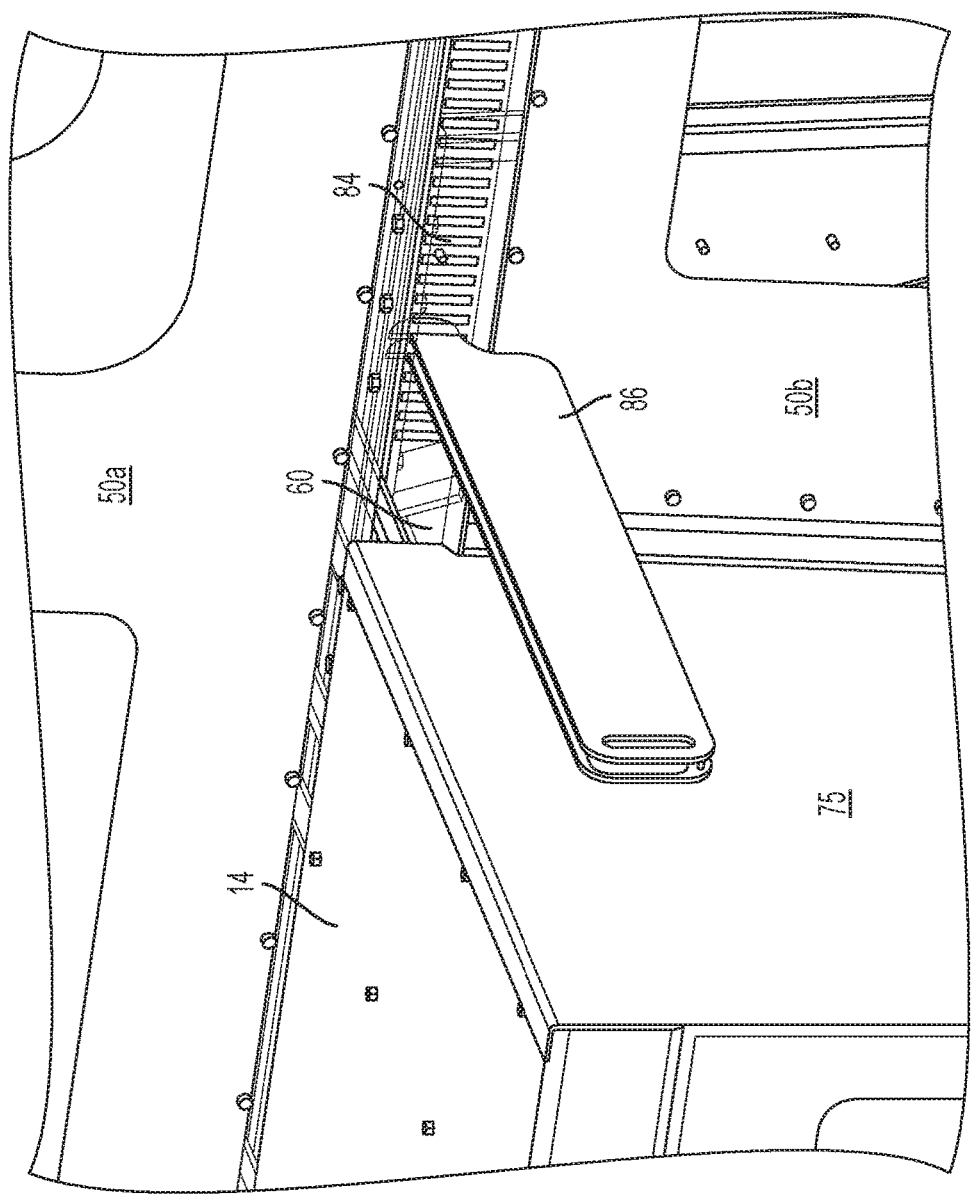
FIG. 6 is a partial perspective view of the trailer as in FIG. 1A.

As illustrated in FIG. 6, I-beam 60 defines a plurality of slots 84 extending into the beam's web laterally with respect to the trailer (perpendicular to trailer axis 24, in FIG. 1A). A removable bracket 86 has, at one end, an L-shaped extension (not shown) sized to be received within any of the slots 84. When bracket 86 is inserted into a slot 84 as shown, the "upper" part of the "L" of the L-shaped extension extends through slot 84 to the opposite side of the web of I-beam 60, where the "lower" part of the "L" extends downward, so that the whole of bracket 86 defines a downward-facing U-shape. An operator secures a bracket 86 in position by inserting the "lower" part of the L-shaped extension into and through a slot 84 and rotating the bracket until the "lower" part of the "L" extension is vertical and the "upper" part of the "L" extends through the slot.

Depending upon the size of the glass plates transported by trailer 10, the forward edge of the plates can be expected to be positioned along I-beam 60, while the plate's rearward edge abuts the vertical transition between rear deck segment 18 and central deck segment 16. Thus, bracket 86 may be inserted into the slot 84 next adjacent the plate's forward edge to thereby provide a retainer structure for the glass plate in the trailer's forward direction. An identical arrangement is provided on the opposite side of beam 26 to retain one or more glass plates in the forward direction on the opposite side of the chassis beam. Movement of the plate(s) in the rearward longitudinal direction is prevented in some embodiments by the vertical transition plate between deck segment 18 and deck segment 16, though it should be understood that in other embodiments I-beam 62 may also be provided with slots 84 as in beam 60, so that a bracket such as bracket 86 at beam 60 may also be received and secured in beam 62 to secure the glass plate's opposite edge in the rearward direction of the trailer. A similar two-bracket arrangement can be provided on the opposite side of trailer 10 as well. Straps may be attached to brackets 86 so that the straps extend across the plate resting on the respective planar receiving surfaces defined by rails 52*a*, and 52*b*, on the side of the plates opposite the rails, and attach to an attachment point at rear deck segment 18 to thereby hold the glass plate laterally in position against rails 52*a* and 52*b*. Brackets 86 may be secured in a given slot 84 by gravity, by a detent provided within each respective slot, by a lock pin inserted through a hole at the end of deck 36 that extends on the opposing side of a given slot 84, and/or by other suitable mechanism.

While one or more embodiments of the present invention has been described above, it should be understood that any and all equivalent realizations of the present invention are included within the scope and spirit of the present disclosure. Thus, the embodiments presented herein are by way of example only and are not intended as limitations of the invention. Therefore, it is contemplated that any and all such embodiments are included in the present invention, though not in limitation thereof.

What is claimed is:

1. A trailer for carrying plate glass, comprising:
    an elongated deck defining a surface at an upper major side of the deck;
    an elongated rigid beam extending longitudinally in parallel with a longitudinal axis of the deck;
    a plurality of wheels attached to at least one of the deck and the beam at a first end of the elongated deck at or below a lower major side of the deck opposite the upper major side so that the plurality of wheels are rotatable about at least one axis transverse to the longitudinal axis;
    a coupler for coupling to a wheeled rear end of a towing vehicle, the coupler being attached to at least one of the deck and the beam and disposed at a second end of the deck opposite the first end;
    wherein the beam extends higher than at least a portion of the deck and is attached to the deck so that the beam transfers load from the deck to the plurality of wheels and the coupler; and
    at least one generally planar receiving surface that is defined by or attached to the beam higher than the at least a portion of the deck so that a portion of the beam that extends higher than a highest portion of the deck between the coupler and the plurality of wheels supports at least one glass plate received by the receiving surface in a horizontal direction perpendicular to the longitudinal axis.

2. The trailer as in claim 1, wherein the elongated deck comprises a plurality of deck segments that define respective portions of said surface at the upper major side that are parallel to each other, wherein the respective surface portion of each said deck segment is offset from the respective surface portion of at least one other said deck segment in a direction perpendicular to the longitudinal axis.

3. The trailer as in claim 1, wherein the coupler is a kingpin.

4. The trailer as in claim 2, comprising a first said deck segment at the first end of the deck, a second said deck segment at the second end of the deck, and a third said deck segment between the first deck segment and the second deck segment, wherein the third deck segment is below the first deck segment and the second deck segment.

5. The trailer as in claim 4, wherein the beam comprises a top section comprised of at least one generally planar portion and a web extending between the top section and the deck, wherein the top section extends to and between the first end and the second end, and wherein the generally planar portion defines at least one planar dimension that is perpendicular to the longitudinal axis and parallel to a planar dimension of the respective surface portions.

6. The trailer as in claim 5, wherein a central said generally planar portion of the beam is directly vertically above the third deck segment and is vertically offset from the third deck segment by a distance greater than respective vertical offsets between the third deck segment and the first deck segment and between the third deck segment and the second deck segment.

7. The trailer as in claim 6, wherein the distance is at least about four feet.

8. The trailer as in claim 6, wherein the distance is about eight feet.

9. The trailer as in claim 7, wherein the respective vertical offsets are about four feet or less.

10. The trailer as in claim 5, wherein the web comprises at least one metallic sheet extending from the top section of the beam to the deck.

11. The trailer as in claim 1, wherein the beam and the deck are aluminum.

12. The trailer as in claim 4, including respective pluralities of generally vertically extending rails attached to opposing sides of the beam and defining respective said generally planar receiving surfaces, so that glass plates received by the respective generally planar receiving surfaces are supported by the third deck segment in a vertical direction and by the beam in the horizontal direction.

13. A trailer for carrying plate glass, comprising:
    an elongated deck defining a surface at an upper major side of the deck;
    an elongated rigid beam extending longitudinally in parallel with a longitudinal axis of the deck, the beam comprising a top section comprising a flange and a web extending between the flange and the deck;
    a plurality of wheels attached to at least one of the deck and the beam at a first end of the elongated deck at or below a lower major side of the deck opposite the upper major side so that the plurality of wheels are rotatable about a plurality of axes, each axis of the plurality of axes corresponding to at least two wheels of the plurality of wheels, transverse to the longitudinal axis;
    a coupler for coupling to a wheeled rear end of a towing vehicle, the coupler being attached to at least one of the deck and the beam and disposed at a second end of the deck opposite the first end;
    wherein the web extends higher than a highest portion of the deck between the coupler and the plurality of wheels and is attached to the deck so that the beam transfers load from the deck to the plurality of wheels and the coupler; and
    at least one generally planar receiving surface that is defined by or attached to the beam higher than at least a portion of the deck so that the beam supports at least one glass plate received by the receiving surface.

14. The trailer as in claim 13, wherein the receiving surface is attached to the beam and the deck.

15. The trailer as in claim 14, where the receiving surface is attached to the beam and the deck so that the receiving surface transfers load from the at least one glass plate to the beam directly and via the deck.

16. The trailer as in claim 13, wherein the receiving surface is attached to the beam so that the receiving surface transfers load from the at least one glass plate to the beam without loading the deck.

17. The trailer as in claim 13, comprising two said generally planar receiving surfaces at respective opposing sides of the beam.

18. The trailer as in claim 17, wherein the elongated deck comprises a plurality of deck segments that define respective portions of said surface at the upper major side that are parallel to each other, and wherein the respective surface portion of each said deck segment is offset from the respective surface portion of at least one other said deck segment in a direction perpendicular to the longitudinal axis.

19. The trailer as in claim 18, comprising a first said deck segment at the first end of the deck, a second said deck segment at the second end of the deck, and a third said deck segment between the first deck segment and the second deck segment, wherein the third deck segment is below the first deck segment and the second deck segment.

20. The trailer as in claim 19, wherein the flange comprises at least one generally planar portion, wherein the top section extends to and between the first end and the second end, and wherein the generally planar portion defines at least one planar dimension that is perpendicular to the longitudinal axis and parallel to a planar dimension of the respective surface portions.

21. The trailer as in claim 20, wherein a central said generally planar portion of the beam is directly vertically above the third deck segment and is vertically offset from the third deck segment by a distance greater than respective vertical offsets between the third deck segment and the first deck segment and between the third deck segment and the second deck segment.

22. The trailer as in claim 21, wherein the distance is at least about four feet.

23. The trailer as in claim 21, wherein the distance is about eight feet.

24. The trailer as in claim 13, wherein the beam and major surfaces of the deck are aluminum.

25. The trailer as in claim 19, including respective pluralities of generally vertically extending rails attached to opposing sides of the beam and defining respective said generally planar receiving surfaces, so that glass plates received by the respective generally planar receiving surfaces are supported by the third deck segment in a vertical direction and by the beam in a horizontal direction perpendicular to the longitudinal axis.

26. The trailer as in claim 13, wherein the elongated deck comprises a plurality of deck segments that define respective portions of said surface at the upper major side that are parallel to each other, wherein the respective surface portion of each said deck segment is offset from the respective surface portion of at least one other said deck segment in a direction perpendicular to the longitudinal axis.

27. The trailer as in claim 26, comprising a first said deck segment at the first end of the deck, a second said deck segment at the second end of the deck, and a third said deck segment between the first deck segment and the second deck segment, wherein the third deck segment is below the first deck segment and the second deck segment.

28. The trailer as in claim 27, wherein a central portion of the top section is directly vertically above the third deck segment, a forward portion of the top section extends from the first deck segment to the central portion, and a rearward portion of the top section extends from the second deck segment to the central portion.

29. The trailer as in claim 28, wherein each of the forward portion of the top section, the central portion of the top section, and the rearward portion of the top section defines a generally planar upper surface, wherein the respective portions of said surface defined by the plurality of deck segments are generally planar, and wherein the generally planar upper surface of the central portion of the top section is parallel to the generally planar respective portions of said surface defined by the plurality of deck segments.

30. The trailer as in claim 13, wherein the flange is wider than the web in a dimension that is perpendicular to the longitudinal axis and parallel to the plurality of axes.

31. The trailer as in claim 30, wherein the web comprises a pair of metallic sheets offset from each other and extending vertically between opposed flanges.

32. The trailer as in claim 1, wherein the at least one generally planar receiving surface is defined by or rigidly attached to the beam.

33. The trailer as in claim 13, wherein the at least one generally planar receiving surface is defined by or rigidly attached to the beam.

34. A trailer for carrying plate glass, comprising:
an elongated deck comprised of at least one deck segment defining a surface at an upper major side of the deck;
an elongated rigid beam extending longitudinally in parallel with a longitudinal axis of the deck;
a plurality of wheels attached to at least one of the deck and the beam at a first end of the elongated deck at or below a lower major side of the deck opposite the upper major side so that the plurality of wheels are rotatable about at least one axis transverse to the longitudinal axis;
a coupler for coupling to a wheeled rear end of a towing vehicle, the coupler being attached to at least one of the deck and the beam and disposed at a second end of the deck opposite the first end;
wherein,
the beam is attached to the deck so that the beam transfers load from the deck to the plurality of wheels and the coupler,
the elongated deck comprises a first said deck segment, a second said deck segment, and a third said deck segment,
the first, second, and third deck segments define respective portions of said surface at the upper major side that are parallel to each other,
the third deck segment is between the first deck segment and the second deck segment,
the respective surface portion of the third deck segment is offset below the respective surface portions of the first deck segment and the second deck segment, and
the beam defines a height, from a bottom of the beam to a top of the beam directly vertically above the third deck segment, that is at least twice as great as respective vertical offsets between the third deck segment and the first deck segment and between the third deck segment and the second deck segment; and
at least one generally planar receiving surface that is defined by or attached to the beam higher than at least the third deck segment so that the beam supports at least one glass plate received by the receiving surface in a horizontal direction perpendicular to the longitudinal axis.

35. The trailer as in claim 34, wherein the at least one generally planar receiving surface is defined by or rigidly attached to the beam.

36. A trailer for carrying plate glass, comprising:
an elongated deck comprising an upper major side of the deck;

an elongated rigid beam extending longitudinally in parallel with a longitudinal axis of the deck;

a plurality of wheels attached to at least one of the deck and the beam at a first end of the elongated deck at or below a lower major side of the deck opposite the upper major side so that the plurality of wheels are rotatable about at least one axis transverse to the longitudinal axis;

a coupler for coupling to a wheeled rear end of a towing vehicle, the coupler being attached to at least one of the deck and the beam and disposed at a second end of the deck opposite the first end;

wherein the beam extends higher than the first end of the elongated deck and is rigidly attached to the deck so that the beam transfers load from the deck to the plurality of wheels and the coupler; and at least one generally planar receiving surface that is defined by or attached to the beam higher than the first end of the elongated deck so that the beam supports at least one glass plate received by the receiving surface in a horizontal direction perpendicular to the longitudinal axis.

* * * * *